United States Patent
Kawai

(10) Patent No.: US 11,463,602 B2
(45) Date of Patent: *Oct. 4, 2022

(54) IMAGE PROCESSING METHOD, IMAGE PROCESSING APPARATUS, AND STORAGE MEDIUM THAT EXTRACT FIRST INFORMATION AND SECOND INFORMATION FROM ACQUIRED IMAGE DATA AND THAT PROCESS THE FIRST INFORMATION ON THE BASIS OF THE SECOND

(71) Applicant: CANON KABUSHIKI KAISHA, Tokyo (JP)

(72) Inventor: Ryoya Kawai, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 152 days.

This patent is subject to a terminal disclaimer.

(21) Appl. No.: 16/930,896

(22) Filed: Jul. 16, 2020

(65) Prior Publication Data

US 2020/0351416 A1 Nov. 5, 2020

Related U.S. Application Data

(63) Continuation of application No. 16/004,697, filed on Jun. 11, 2018, now Pat. No. 10,757,293.

(30) Foreign Application Priority Data

Jun. 28, 2017 (JP) .............................. JP2017-126745

(51) Int. Cl.
*H04N 1/32* (2006.01)
*G06T 1/00* (2006.01)

(52) U.S. Cl.
CPC ....... *H04N 1/32352* (2013.01); *G06T 1/0021* (2013.01); *H04N 1/32267* (2013.01);
(Continued)

(58) Field of Classification Search
CPC ........... H04N 1/32352; H04N 1/32267; H04N 2201/3249; H04N 2201/3263;
(Continued)

(56) References Cited

U.S. PATENT DOCUMENTS

| 7,253,917 | B2 * | 8/2007 | Umeda | .............. | H04N 1/32144 |
| | | | | | 382/175 |
| 7,408,680 | B2 * | 8/2008 | Miyake | .............. | H04N 1/32229 |
| | | | | | 358/3.06 |

(Continued)

FOREIGN PATENT DOCUMENTS

| CN | 101207680 A | 6/2008 |
| JP | 2002-368984 A | 12/2002 |

(Continued)

OTHER PUBLICATIONS

Extended European Search Report dated Nov. 19, 2018, issued in European Patent Application No. 18178019.8.

(Continued)

*Primary Examiner* — Fayyaz Alam
(74) *Attorney, Agent, or Firm* — Venable LLP

(57) ABSTRACT

An image processing method includes an acquisition step of acquiring image data by capturing printed matter, wherein first information and second information, indicating a type of the first information, are embedded in the printed matter as an electronic watermark, an extraction step of extracting the first information and the second information from the image data acquired at the acquisition step, and a processing step of processing the extracted first information by different processing methods in accordance with the extracted second information. Based on that the type of the first information indicated by the second information is a predetermined type, the extracted first information is processed at the processing step, by a predetermined processing method for access to an (Continued)

external device using the extracted first information and display of a web page based on the access.

14 Claims, 5 Drawing Sheets

(52) U.S. Cl.
CPC .............. *H04N 2201/3249* (2013.01); *H04N 2201/3263* (2013.01); *H04N 2201/3266* (2013.01); *H04N 2201/3267* (2013.01); *H04N 2201/3269* (2013.01)

(58) Field of Classification Search
CPC ... H04N 2201/3266; H04N 2201/3267; H04N 2201/3269; G06T 1/0021
See application file for complete search history.

(56) References Cited

U.S. PATENT DOCUMENTS

| | | | |
|---|---|---|---|
| 9,961,231 B2 | 5/2018 | Iguchi et al. | |
| 2002/0191216 A1* | 12/2002 | Umeda | H04N 1/32144 358/1.15 |
| 2008/0011855 A1* | 1/2008 | Nadabar | G06K 7/10722 235/462.07 |
| 2008/0029602 A1* | 2/2008 | Burian | G06K 7/14 235/462.07 |
| 2013/0297670 A1* | 11/2013 | Lundberg | G06F 3/1285 709/201 |
| 2014/0325328 A1* | 10/2014 | Beadles | H04L 43/08 715/208 |
| 2017/0099410 A1* | 4/2017 | Iguchi | H04N 1/32229 |

FOREIGN PATENT DOCUMENTS

| | | |
|---|---|---|
| JP | 2004-356805 A | 12/2004 |
| JP | 2013-183255 A | 9/2013 |
| JP | 2017-072958 A | 4/2017 |
| KR | 2009-0084619 A | 8/2009 |

OTHER PUBLICATIONS

Office Action dated Mar. 10, 2020, issued in corresponding Chinese Patent Application No. 201810683934.8.
Office Action dated Apr. 20, 2021, issued in Japanese Patent Application No. 2017-126745.

\* cited by examiner

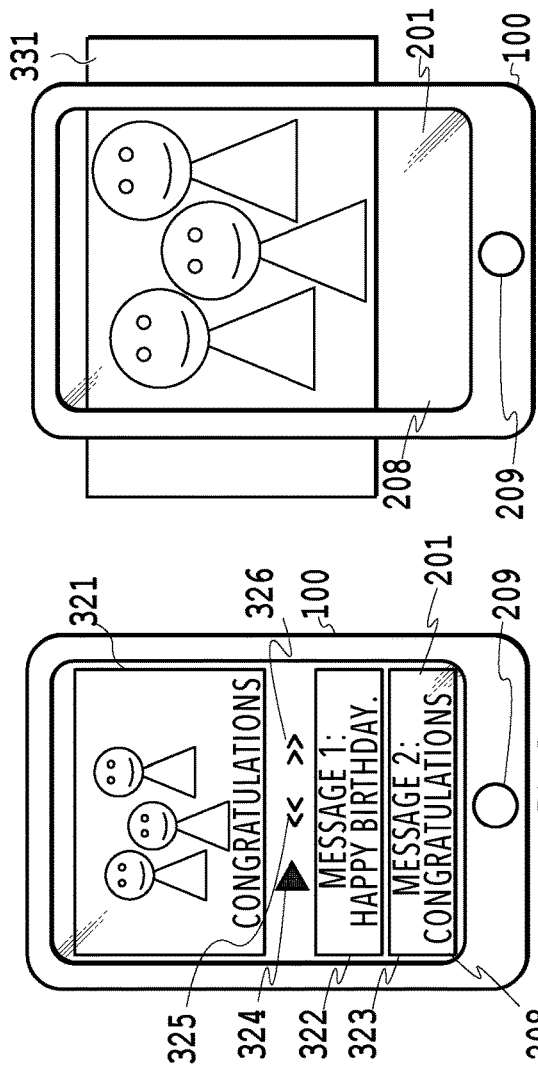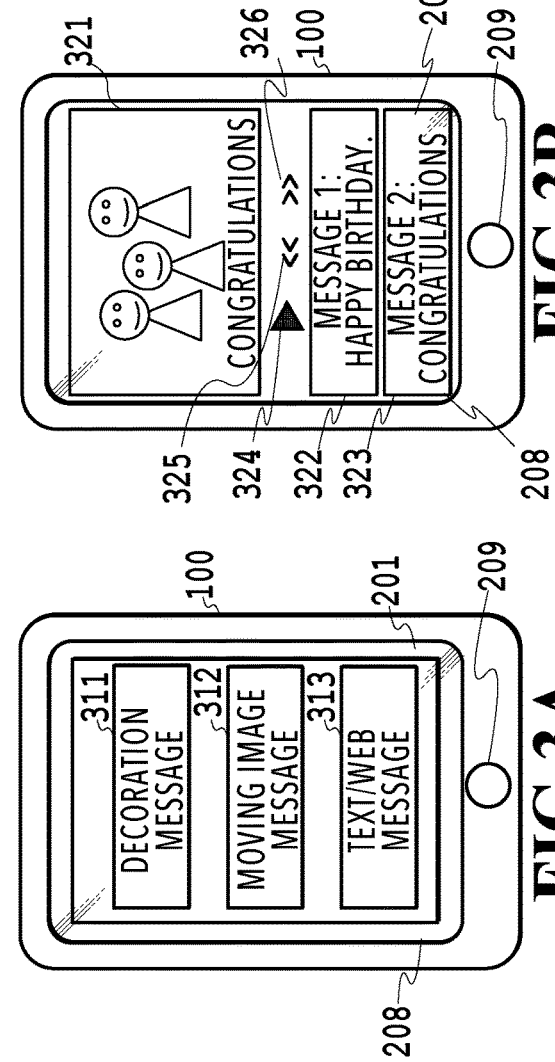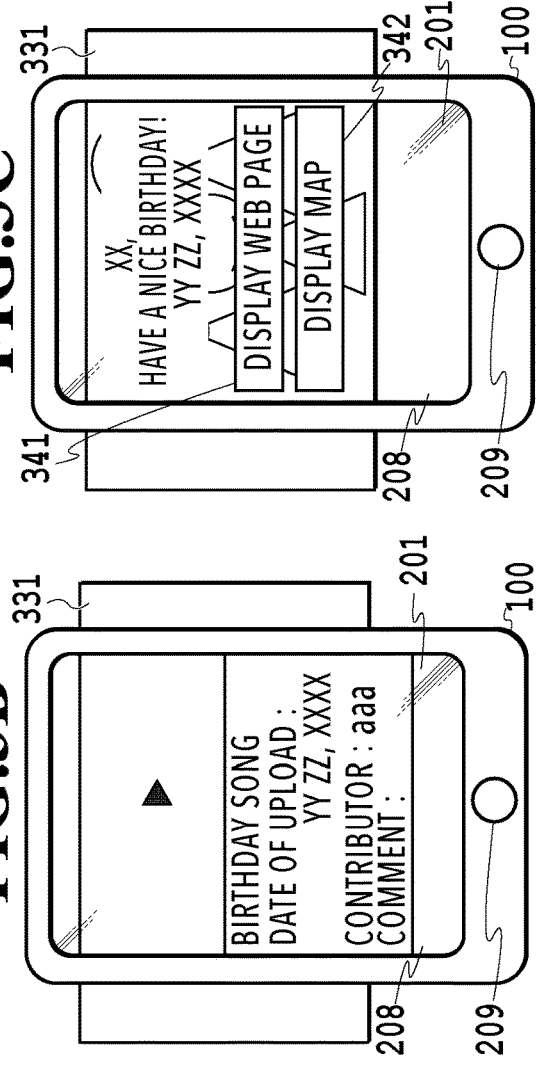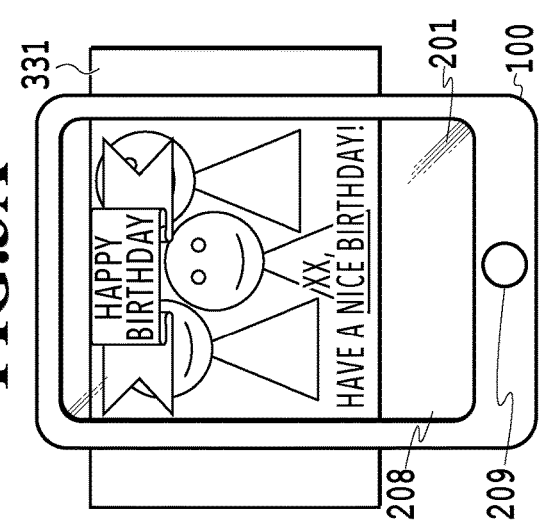

IMAGE PROCESSING METHOD, IMAGE PROCESSING APPARATUS, AND STORAGE MEDIUM THAT EXTRACT FIRST INFORMATION AND SECOND INFORMATION FROM ACQUIRED IMAGE DATA AND THAT PROCESS THE FIRST INFORMATION ON THE BASIS OF THE SECOND

CROSS-REFERENCE TO RELATED APPLICATIONS

This application is a continuation of copending U.S. patent application Ser. No. 16/004,697, filed Jun. 11, 2018, which claims the benefit of Japanese Patent Application No. 2017-126745, filed Jun. 28, 2017, each of which is hereby incorporated by reference in its entirety.

BACKGROUND OF THE INVENTION

Field of the Invention

The present invention relates to a technique to embed information in an image and to read the embedded information.

Description of the Related Art

Japanese Patent Laid-Open No. 2013-183255 has disclosed reproducing moving image data by outputting printed matter in which moving image data and information about a storage location of associated information are embedded in an image and by accessing the storage location based on the information extracted from captured image data obtained by capturing the printed matter.

SUMMARY OF THE INVENTION

However, Japanese Patent Laid-Open No. 2013-183255 has not disclosed switching displays in accordance with a type of additional information embedded in an image. Because of this, there is a possibility that it is not possible to appropriately produce a display based on additional information embedded in an image.

Consequently, in view of the above-described problem, an object of the present invention is to produce a display in accordance with a type of additional information extracted from captured image data.

In one aspect, the present invention is directed to an image processing method including a selection step of selecting a type of first processing-target information that is embedded in a printing-target image in accordance with instructions by a user, an embedment step of embedding the first information and second information indicating a type selected at the selection step in the printing-target image as an electronic watermark, a printing control step of causing a printing apparatus to print the printing-target image in which the first information and the second information are embedded at the embedment step, an acquisition step of acquiring captured image data obtained by capturing printed matter obtained by printing at the printing control step, an extraction step of extracting the first information and the second information based on captured image data acquired at the acquisition step, and a processing step of processing the first processing-target information extracted at the extraction step by different processing methods in accordance with the second information.

Further features of the present invention will become apparent from the following description of exemplary embodiments with reference to the attached drawings.

BRIEF DESCRIPTION OF THE DRAWINGS

FIG. 3A to FIG. 3F are diagrams showing UI screens of a message creation/display application;

DESCRIPTION OF THE EMBODIMENTS

In the following, with reference to the attached drawings, preferred embodiments of the present invention are explained in detail. The following embodiments are not intended to limit the present invention according to the scope of the claims. Further, all combinations of features explained below are not necessarily indispensable to the solution of the problem of the present invention.

First Embodiment

In the present embodiment, print data is created by embedding (also called embedment processing or multiplexing processing) additional information (also called multiplexed information or embedded information) in an image. Then, additional information is taken out from captured image data obtained by capturing printed matter of the print data (also called extraction processing or separation processing) and the additional information is displayed in an appropriate format.

The embedment processing, the extraction processing, and the display processing described above are performed in an image processing apparatus (information processing apparatus). It may also be possible to use any apparatus capable of the processing described previously as the image processing apparatus. However, in the following, for convenience of explanation, an explanation is given by taking the case as an example where the image processing apparatus is a mobile terminal. As a mobile terminal, mention is made of a personal information terminal, such as PDA (Personal Digital Assistant), a mobile telephone, a smartphone, and so on. A smartphone is a multifunction mobile telephone mounting a camera function, an Internet browser function, a mail function, and so on, in addition to the mobile telephone function.

<About Configuration of Mobile Terminal>

Figure 1A:
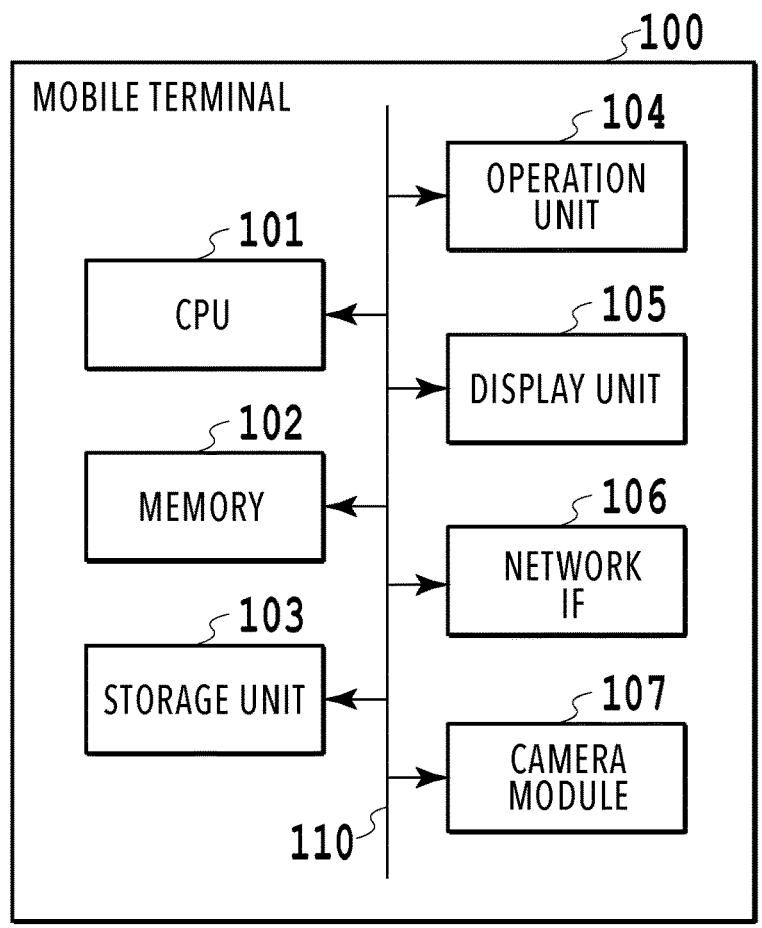
FIG. 1A and FIG. 1B are block diagrams showing configurations of a mobile terminal.

In the following, a configuration of a mobile terminal in the present embodiment is explained. First, a hardware configuration of a mobile terminal is explained by using FIG. 1A. As shown in FIG. 1A, a mobile terminal 100 includes a CPU 101, a memory 102, a storage unit 103, an operation unit 104, a display unit 105, a network interface (interface is abbreviated to IF) 106, and a camera module 107. These components are connected via a bus 110 and each is capable of performing transmission and reception of data with one another.

The CPU 101 is a unit configured to centrally control the mobile terminal 100 and to perform each piece of processing by loading programs stored in the storage unit 103 onto the memory 102 and executing the loaded programs. The memory 102 is, for example, a random access memory (RAM), used as a work area of the CPU 101, and temporarily stores various kinds of data. The storage unit 103 is, for example, a flash memory and stores various programs for performing the processing of the mobile terminal 100 and data, such as parameters, necessary for the processing of the mobile terminal 100. The programs stored in the storage unit 103 include various control programs, such as an operating system (hereafter, abbreviated to OS) and applications, and programs for performing processing to be described later are also stored in the storage unit 103.

The operation unit 104 is a user interface that receives an operation of a user and includes buttons, a touch panel, and so on. The display unit 105 is a user interface that displays various kinds of information to a user and includes a liquid crystal panel, and the like. Although details will be described later, on the display unit 105, a user interface screen (hereafter, abbreviated to a UI screen) of an application installed in the mobile terminal 100 is displayed. The network IF 106 is an interface that connects the mobile terminal 100 to a network. The mobile terminal 100 is capable of connecting to the Internet or external devices, such as a printer and a scanner, via the network 106. The camera module 107 is a module used for image capturing and it is possible for a user to operate the camera module 107 through a camera application, and the like, installed in the mobile terminal 100. The CPU 101 creates image data based on information received from the camera module 107. The created image data is stored in the memory 102 or the storage unit 103 and displayed on the display unit 105 as needed.

Figure 1B:
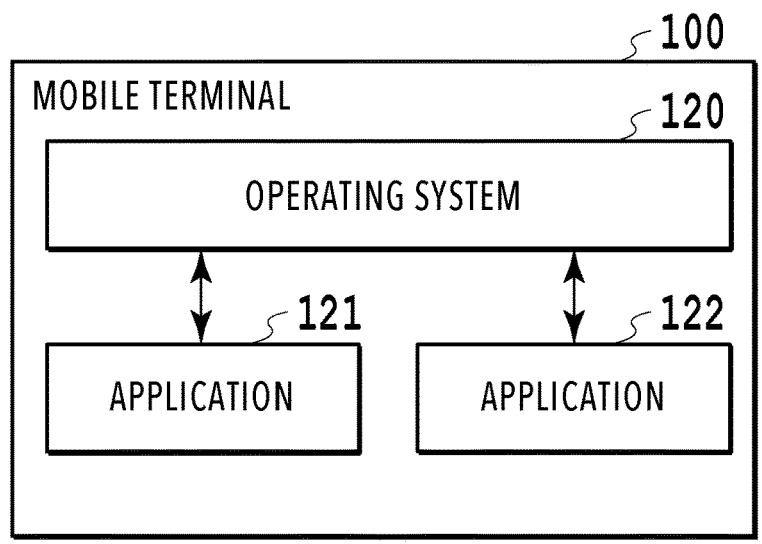

Following the above, a software configuration of the mobile terminal is explained by using FIG. 1B. As shown in FIG. 1B, the mobile terminal 100 includes an OS 120, an application 121, and an application 122. These programs of software are stored in the storage unit 103 and loaded onto the memory 102 and executed by the CPU 101.

The plurality of applications included in the mobile terminal 100 are downloaded via a network, such as the Internet, and installed, and it is possible for a user to make use of each of the plurality of applications on the mobile terminal 100. The number of applications that the mobile terminal 100 has is not limited to two and the number may be one or three or more.

The application 121 and the application 122 operate via the OS 120. For example, it is possible for these applications to acquire information acquired by the camera module 107 as image data via the OS 120. Further, for each of the application 121 and the application 122, information (activation information) for activating these applications is defined. For example, in the case when the application 121 transmits activation information for activating the application 122, which is created in a format determined in advance, to the OS 120, the application 122 is activated by the OS 120. In the present embodiment, for example, the application 121 is a message creation/display application and the application 122 is a Web browser application or a map application. Details of the message creation/display application will be described later.

Further, it is possible for the CPU 101 to create data that is a printing target by a printer by executing the application 121 and the OS 120, and to cause a printer connected to the network IF 106 to print an image based on the data.

<About Display Screen of Mobile Terminal>

Figure 2:
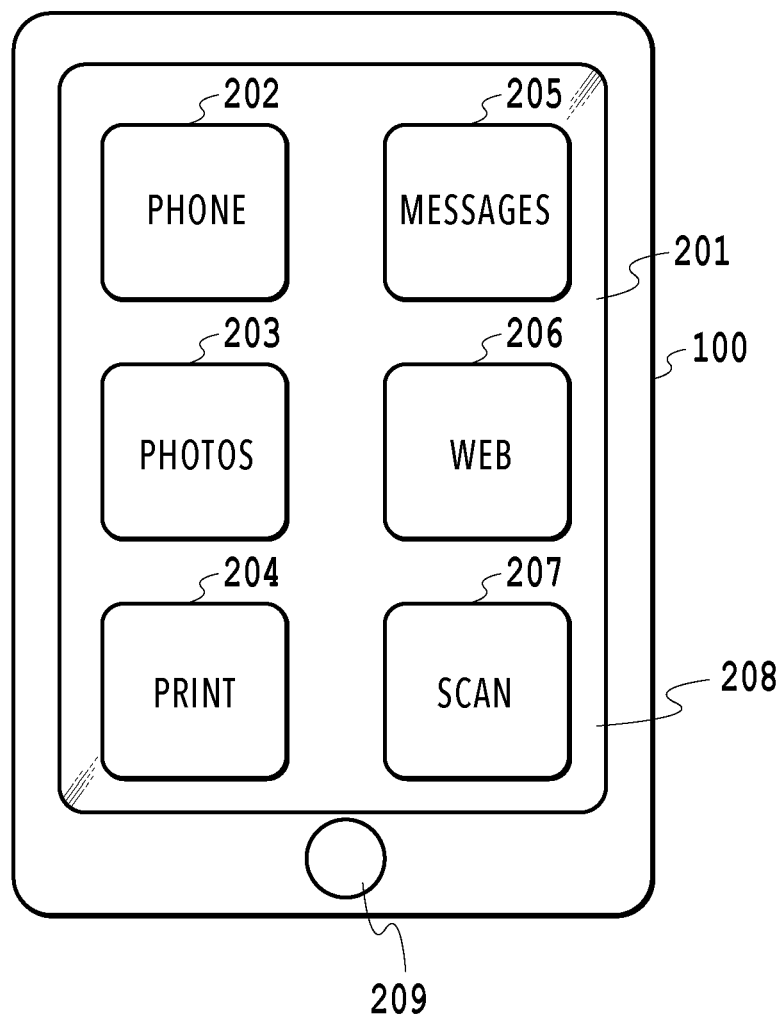
FIG. 2 is a diagram showing a home screen.

In the following, a display screen of the mobile terminal 100 in the present embodiment is explained by using FIG. 2 and FIG. 3A to FIG. 3F. FIG. 2 is a diagram showing a home screen that is displayed on the display unit 105 of the mobile terminal 100, specifically, on a liquid crystal display 201. The home screen is a screen that is the start point of all the operations and a screen on which icons of applications installed in the mobile terminal 100 are displayed in a list. In the example in FIG. 2, six icons, that is, a Phone icon 202, a Photos icon 203, a Print icon 204, a Messages icon 205, a Web icon 206, and a Scan icon 207 are displayed. These icons are pressed down (tapped) by a user at the time of activating applications.

In the case when the screen is tapped by a user, the tap of a user is detected by a touch panel 208 provided on the liquid crystal display 201. The touch panel 208 is one of the components of the operation unit 104 of the mobile terminal 100 and detects the operation of a user, specifically, detects a tap, a flick, a swipe, and so on.

In the case when a user taps the icon of an application, the tap of the user is detected by the touch panel 208 and an event corresponding to the tapped icon, that is, a graphical user interface (GUI) part (also called an object) is issued. As a result of this, the application corresponding to the touched icon activates. For example, in the case when the Web icon 206 is tapped in the state shown in FIG. 2, a Web browser activates.

Further, the mobile terminal 100 includes a home button 209. By pressing down the home button 209 while activating the application, it is possible to close the screen of the application being activated and to return to the home screen.

FIG. 3A is a diagram showing a UI screen displayed on the liquid crystal display 201 in the case when the Messages icon 205 in FIG. 2 is tapped and the message creation/display application activates. The message creation/display application is an application that performs processing to create print data in which data (meta data) relating to a message is embedded in an image and processing to display a message based on captured image data obtained by capturing printed matter of the print data.

The UI screen shown in FIG. 3A has three objects for a user to select a type of a message to create. That is, in the present embodiment, at the time of creating a decoration message, an object 311 is tapped. Similarly, at the time of creating a moving image message, an object 312 is tapped and at the time of creating a text/Web message, an object 313 is tapped. In the present embodiment, the message creation/display application embeds one of the three kinds of message data in an image in accordance with a selection of a user, but the number of types of message data that the message creation/display application can create is not limited to three. It may also be possible for the message creation/display application to be capable of creating message data of a type other than the three types described previously.

The decoration message is a message of the type in which a message input by a user is displayed while animation and music prepared in advance for each theme are being reproduced. The moving image message is a message of the type that reproduces a moving image prepared by a user and displays a message by a moving image. The text/Web message is a message of the type in which a message input by a user is displayed in the text format and along with the message, information accompanying this, that is, the date and time, the position, the link to an arbitrary Web page, and so on, are displayed.

By tapping one of the objects 311 to 313, a UI screen for creating print data by embedding message data corresponding to the tapped object in an image is displayed. It is possible for a user to create print data in which message data is embedded in an image via this UI screen.

FIG. 3B is a diagram showing an example of a UI screen for decoration message creation in the message creation/display application, which is displayed in the case when a user creates a decoration message by tapping the object 311. An image 321 is an image that a user selects to perform printing by embedding a message. In the present embodiment, in the case when the image 321 is tapped, it is possible to change an image that is displayed on the UI screen for decoration message creation to an image different from the image currently selected. Alternatively, it may also be possible to provide a button to select or to change an image on the UI screen for decoration message creation separately from the image 321. Further, it is also possible to select an image of an already-captured photo as a printing-target image that is displayed on the UI screen for decoration message creation, or to use an image of a photo newly captured on the spot.

It is possible for a user to edit a message that is displayed in each scene in animation of a decoration message by tapping a text box 322 or a text box 323. A reproduce button 324, a return button 325, and a forward button 326 are buttons for controlling a preview of a decoration message. In the case when a user taps the reproduce button 324, a decoration message is reproduced from the beginning. Further, in the case when a user taps the return button 325, it is possible to return to the scene one previous of the scene currently being reproduced and, in the case when a user taps the forward button 326, it is possible to proceed to the scene one ahead of the scene currently being reproduced. Further, in the case of FIG. 3B, the message "Happy birthday." input to the text box 322 is displayed in the first scene and the message "Congratulations!" input to the text box 323 is displayed in the second scene, and, therefore, it is known that the second scene is being reproduced.

In the case when the object 312 is tapped in FIG. 3A, an input screen for inputting information relating to a moving image message is displayed. For example, a screen for a user to input a URL at the moving image site on a Web is displayed. Further, in the case when the object 313 is tapped in FIG. 3A, an input screen, on which a message can be input and information accompanying the message (date, position, URL of arbitrary Web page, and so on) can be input, is displayed. After these input screens are displayed, or after the input screen shown in FIG. 3B is displayed, a printing instructions screen on which a user can give instructions as to printing is displayed on the display unit 105 by the message creation/display application. Then, in the case when instructions as to printing are given on the printing instructions screen, the CPU 101 creates data based on the image in which additional information input by a user is embedded and transmits the data to the printer by the message creation/display application and the OS 120. The printer to which the data is transmitted is a printer connected by a network I/F and the identification information (MAC address, IP address in wireless LAN, and so on) for identifying the printer is registered in the message creation/display application. In the case when a plurality of printers is registered, in accordance with the identification information on the printer selected by a user, printing-target data is transmitted to the printer.

FIG. 3C is a diagram showing a UI screen that is displayed at the time of performing image capturing by using the message creation/display application with the mobile terminal 100 being held above printed matter 331 of the print data created by using the message creation/display application. The printed matter 331 is printed matter obtained by one of the objects 311 to 313 being selected in FIG. 3A as described above and by an image in which additional information is embedded being printed by the printer as described above after a user inputs the additional information. As shown in FIG. 3C, on the UI screen, an image captured by the camera module 107, which the message creation/display application has acquired from the OS 120, is displayed.

Further, it is possible to display a message (that is, a decoration message, a moving image message, a text/Web message) on an appropriate UI screen by analyzing message data embedded in an acquired image by using the message creation/display application.

FIG. 3D to FIG. 3F are examples of a UI screen representing results of analyzing an image acquired from the OS 120 after capturing the printed matter 331 by using the message creation/display application. FIG. 3D shows an example of a UI screen for displaying a decoration message, that is, a UI screen for reproducing music and animation, as well as displaying a message input by a user. FIG. 3E shows an example of a UI screen for displaying a moving image message, that is, a UI screen for reproducing a moving image existing at the URL destination included in message data.

FIG. 3F shows an example of a UI screen for displaying a text/Web message. In this example, the message and the date are displayed and further, a button 341 to open a Web page and a button 342 to display a map and clearly specify the position indicated by the position information on the map are displayed. These display items are not displayed in the case when data corresponding to each display item is not included in message data.

It is supposed that additional information is embedded in the printed matter 331 by a user specifying the object 311 at the time of printing of the printed matter 331. In this case, the UI screen shown in FIG. 3D is displayed at the time of the printed matter 331 being captured by using the message creation/display application. Similarly, in the case when additional information is embedded in the printed matter 331 by a user specifying the object 312, the UI screen shown in FIG. 3E is displayed at the time of the printed matter 331 being captured. Further, in the case when additional information is embedded in the printed matter 331 by a user specifying the object 313, the UI screen shown in FIG. 3F is displayed at the time of the printed matter 331 being captured.

The message creation/display application embeds information corresponding individually to the objects 311 to 313, respectively, in the printed matter 331 at the time of printing of the printed matter 331. That is, the information capable of specifying the type of the message to be embedded is embedded along with the contents of the message. Then, the message creation/display application analyzes the message data embedded in the image acquired from the OS 120 and displays the message by using the UI screen in accordance with the type of the message (message type). This will be described later by using FIG. 5.

Here, a case is explained when the processing to embed additional information and the processing to extract additional information are performed by one application. That is, the same message creation/display application performs both the processing to create print data in which message data is embedded in an image and the processing to extract message data from captured image data obtained by capturing printed matter and to display a message. However, the present embodiment is not limited to this case. For example, as another embodiment, an aspect is considered in which the processing to create print data in which message data is embedded in an image and the processing to extract message data from captured image data obtained by capturing printed matter and to display a message are performed by different applications, respectively. In this case, the format of message data used by both the applications is determined in advance and the application that creates print data creates print data by creating message data in that format and embedding the message data in an image. On the other hand, the application that displays a message analyzes message data in the format determined in advance and displays a message on an appropriate UI screen.

<About Processing to Create Print Data in which Additional Information is Embedded in Image and to Print the Print Data>

Figure 4:
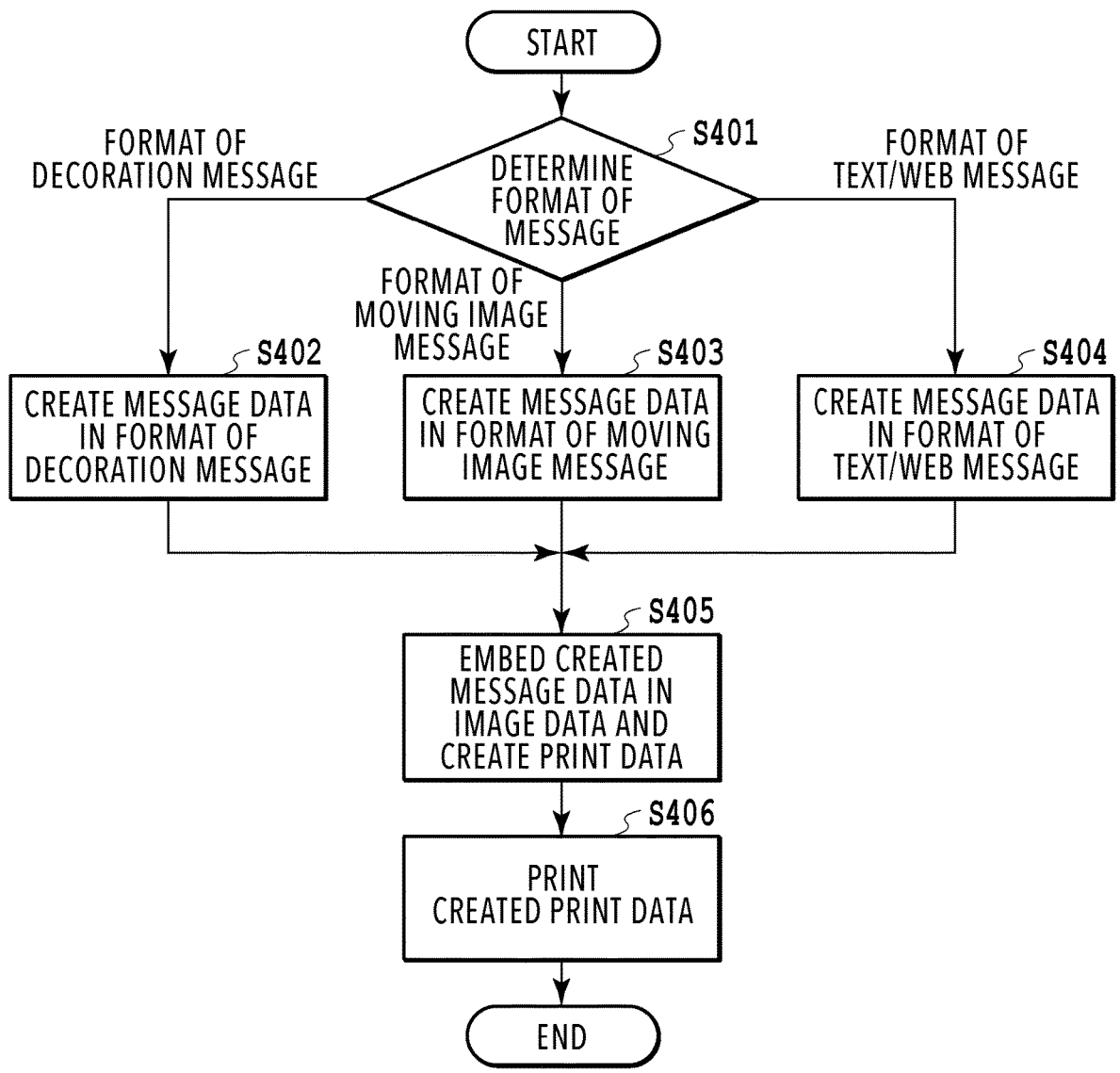
FIG. 4 is a flowchart of processing to create print data and to print the print data.

In the following, the processing to create print data in which additional information, that is, message data is embedded in an image by using the message creation/display application and to print the print data in the present embodiment is explained by using FIG. 4. The following processing at each step is performed by the CPU 101. Further, the processing shown in FIG. 4 is performed, for example, in the case when instructions as to printing are given after the message type is selected (one of the objects 311 to 313 is tapped) and additional information is input by a user.

At step S401, the CPU 101 functions as a format determination unit and determines the format of the creation-target message data in accordance with the message type selected by a user. In the present embodiment, for each piece of message data of a decoration message, a moving image message, and a text/Web message that can be created by using the message creation/display application, a corresponding format is determined in advance. That is, specifically, at this step, the format of message data is determined in accordance with which of the object 311, the object 312, and the object 313 is tapped on the UI screen shown in FIG. 3A.

In the case when the format of message data is determined uniquely at step S401, a UI screen (for example, FIG. 3B, and the like) for creating message data in the determined format is displayed on the message creation/display application. It is possible for a user to select image data that a user desires to print, such as a photo, to input a message that is added to the selected image data, and so on, via this UI screen. Further, it is also possible for a user to specify a color and a font of the character for the input message via this UI screen.

In the case when a user input via the UI screen after step S401 is completed, at one of steps S402 to S404, information that is embedded in a printing-target image, that is, message data in the format corresponding to the selected message type is created. That is, in the case when the format is determined to be the format of a decoration message at step S401, the CPU 101 functions as a message data creation unit at step S402 and creates message data in the format of a decoration message. Alternatively, in the case when the format is determined to be the format of a moving image at step S401, message data is created in the format of a moving image at step S403. Alternatively, in the case when the format is determined to be the format of a text/Web message at step S401, message data is created in the format of a text/Web message at step S404.

For message data that is created in the present embodiment, the format thereof is defined for each message type. That is, the message data created at steps S402 to S404 is different in format from one another and, in the message data, information in accordance with each message type is included.

For example, in message data created in the decoration message-specific format, an identifier indicating that the message is a decoration message and information on (parameter of) a theme specifying animation and music to be reproduced are included. Here, as the theme, specifically, mention is made of a birthday, Christmas, and so on. Further, in message data in the format of a decoration message, contents of a message (that is, character string) input by a user are included, and it is also possible to cause the message data to include information on the character, color, and font at the time of displaying the message, and the like. In the following, an explanation is given by using a specific example "ACEBADXX¥EAFHappy birthday. Congratulations!¥TCBHave a nice day!" of message data created in the decoration message-specific format.

In the above-described message data, A is a parameter of an identifier of a message type indicating that the message is a decoration message and CE is a parameter of a theme ID specifying a theme (in this example, birthday). BA that follows is a parameter specifying the font of the message, D is a parameter specifying the character color of the message, and "XX" is the contents of the message. ¥ that follows is a separator separating the message, EA is a parameter specifying a font of the message, F is a parameter specifying the character color of the message, and "Happy birthday. Congratulations!" is the contents of the message. ¥ that follows is a separator, TC is a parameter specifying the font of the message, B is a parameter specifying the character color of the message, and "Have a nice day!" is the contents of the message.

In message data created in the moving image message-specific format, an identifier indicating that the message is a moving image message and a URL of the moving image to be reproduced are included. In the following, an explanation is given by using a specific example "Bhttp://www.abcde-.com/abc" of message data created in the moving image message-specific format.

In the above-described message data, B is a parameter of an identifier of a message type indicating that the message is a moving image message and the character string that follows is a URL of the moving image.

In message data created in the text/Web message-specific format, an identifier indicating that the message is a text/Web message and contents (that is, a character string) of the message input by a user are included. Further, it is also possible to cause the message data in this format to include information on a character color and a font at the time of displaying the message, date information, position information, a URL of a Web page, and so on. Here, the date information is, for example, information indicating the date, such as the day on which the text/Web message was created, and the position information is, for example, information indicating the position, such as the position at which the photo was captured. In the following, explanation is given by using a specific example "CABADWe had a good time!¥Bhttp://www.abcde.com¥CBAD20160719¥D129374000967" of message data created in the text/Web message-specific format.

In the above-described message data, C is a parameter of an identifier of a message type indicating that the message is a text/Web message and A is a parameter indicating that the character string that follows is the message input by a user. BA that follows is a parameter specifying the font of the message, D is a parameter specifying the character color of the message, and "We had a good time!" is the contents of the message. ¥ that follows is a separator, B is a parameter indicating that the character string that follows is the URL of a Web page, and "http://www.abcde.com" is the URL. ¥ that follows is a separator, C is a parameter indicating that the character string that follows is date information, BA is a parameter specifying the font at the time of displaying the date indicated by date information, and D is a parameter specifying the character color at the time of displaying the date. Further, "20160719" that follows is the date and, in this example, the date indicates Jul. 19, 2016. ¥ that follows is a separator, D is a parameter indicating that the character string that follows is position information, and "129374000967" is the contents of position information. As described above, in this example, the position information is included in the message data as information on the latitude and the longitude.

Here, the three kinds of message types are explained. but the message type is not limited to the three kinds of message type. Further, information included in the message data of each message type is not limited to that described above, and any other pieces of information may be included. For example, in the case when an arbitrary stamp can be added to an image on the UI screen of the message creation/display application, it is possible for the message data to include information on the stamp. On the other hand, it is not necessary for the message data to include all the pieces of information determined as the message format and it is possible for a user to selectively input only the information the user desires to input.

At step S405, the CPU 101 functions as a print data creation unit and creates print data by embedding message data created at one of steps S402 to S404 by a method that is difficult for a user to determine (for example, an electronic watermark, and the like). The method of embedding message data in an image is not limited to a method that is difficult for a user to determine, such as an electronic watermark. The message creation/display application may use an arbitrary method by which embedded message data can be determined, and, for example, a method that a user can determine, such as a barcode and a two-dimensional code.

At step S406, the CPU 101 performs printing processing to transmit a print job including the print data created at step S405 to the external image forming apparatus in accordance with printing instructions of a user via the UI screen of the message creation/display application. Due to this, the printed matter in which additional information, that is, message data is embedded is output. In the case when message data is embedded by a method that is difficult for a user to determine, for example, the additional information is embedded for each unit block (multiplexed block) across the surface of the printed matter. The shape of the area where information to be used is embedded is not limited to a rectangle, and it may also be possible to use a unit area in any shape as an area where information is embedded. The above is the contents of the processing to create print data in which additional information is embedded in an image and to perform printing in the present embodiment.

<About Processing to Extract Additional Information from Printed Matter and to Display Extracted Additional Information>

Figure 5:
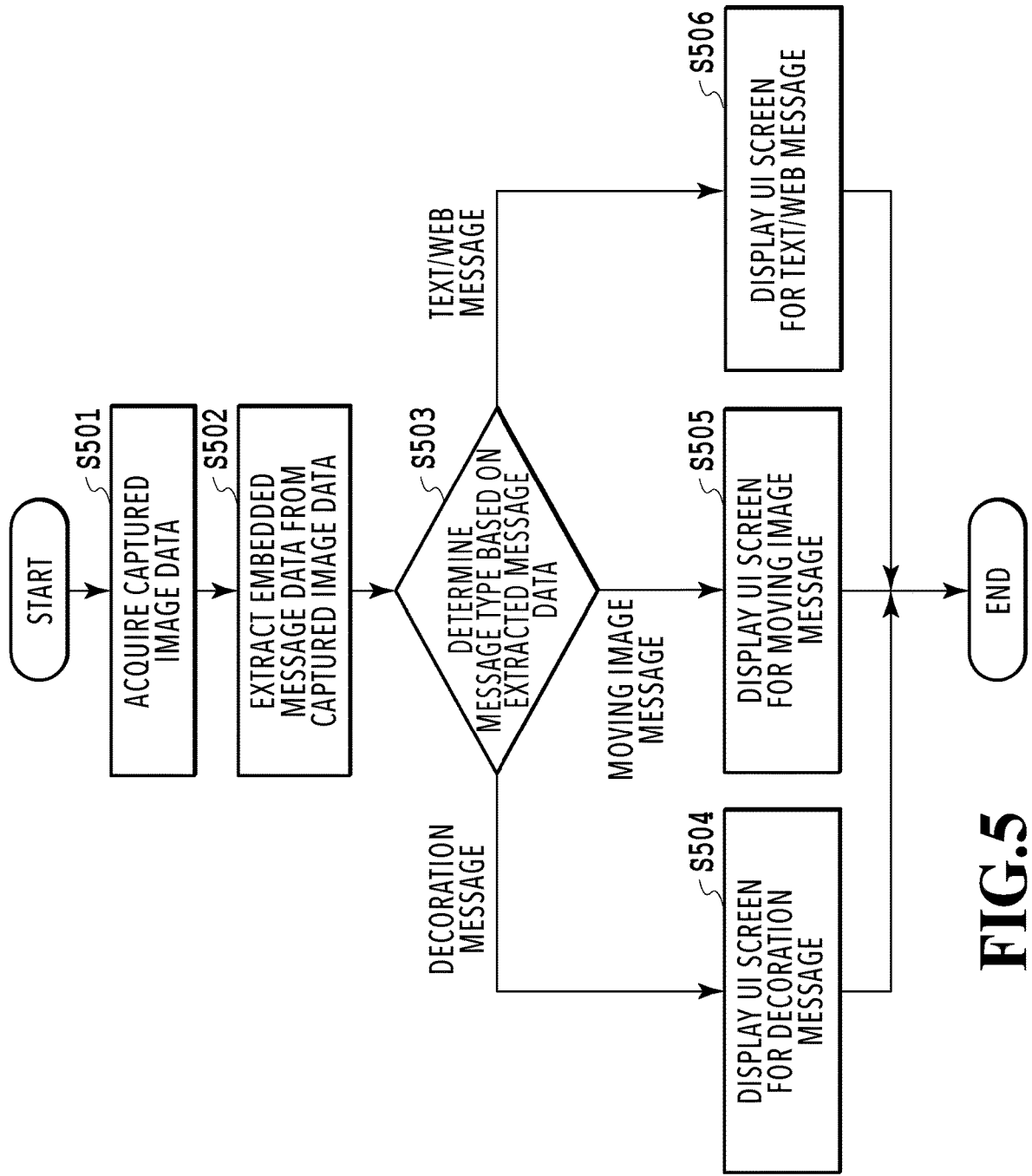
FIG. 5 is a flowchart of processing to extract additional information from printed matter and to display the additional information.

In the following, processing to extract additional information, that is, message data from printed matter, to analyze the extracted message data, and to display the message by using the message creation/display application in the present embodiment is explained by using FIG. 5. The following processing is started in the case when the mobile terminal 100 is held above printed matter output by the printing processing at step S406 and the printed matter is captured by using the message creation/display application. Further, the processing at each step is performed by the CPU 101.

At step S501, captured image data is acquired. The captured image data acquired at this step may be still image data or moving image data.

At step S502, from the captured image data acquired at step S501, additional information, that is, message data is extracted. As described above, this message data is data embedded in an image by the message creation/display application. There is a case when the message data is embedded by a method that is difficult for a user to determine, such as an electronic watermark, or a case when the message data is embedded by a method that a user can determine, such as a barcode and a two-dimensional code.

At step S503, the CPU 101 functions as a message type determination unit and determines the message type based on the message data extracted at step S502. Specifically, based on the identifier of the message type included in the extracted message data, whether the message type is a decoration message, a moving image message, or a text/Web message is determined. That is, in the case when the identifier indicating a decoration message is included in the extracted message data, the message type is determined to be a decoration message. Similarly, in the case when the identifier indicating a moving image message is included in the extracted message data, the message type is determined to be a moving image message and in the case when the identifier indicating a text/Web message is included, the message type is determined to be a text/Web message. The determination processing at this step is important processing for switching UI screens to be displayed after this step. Due to the determination processing at this step, it is made possible to produce a display suitable to each message type at subsequent steps. In the case when the processing at step S503 is not performed, it is no longer possible to appropriately display the message of each type in the subsequent processing. For example, such a case may occur when, in the display of a decoration message, neither animation nor music is reproduced, and only a message is displayed, or when in the display of a text/Web message, the character string of a message is displayed as a Web link.

In the case when it is determined that the message type is a decoration message at step S503, a UI screen for a decoration message is displayed at step S504 and, on the UI screen for a decoration message, an image and a decoration message are displayed. Specifically, animation and music corresponding to information (parameters) of the theme included in the message data are reproduced on the UI screen for a decoration message. Further, in the case when a message input by a user is included in the message data, the message is displayed on the UI screen for a decoration message in harmony with the animation and music. In the case when parameters specifying the character color, the font, and so on, of the message are included in the message data, in addition to the message input by a user, the message is displayed by using the specified character color and font.

In the case when it is determined that the message type is a moving image message at step S503, a UI screen for a moving image message is displayed at step S505 and, on the UI screen for a moving image message, a moving image existing at the URL included in the message data is reproduced. The UI screen, on which a moving image is reproduced, is not limited to the UI screen of the message creation/display application. It may also be possible to deliver the URL to another application, such as a Web browser and a moving image browser application, and to reproduce a moving image on the UI screen of the application other than the message creation/display application. For example, the application 121 as a message creation/display application transmits the activation command of the application 122 as a Web browser to the OS 120 along with the URL. Then, in the case when the OS 120 activates the Web browser and delivers the URL to the Web browser, the activated Web browser displays a Web page in accordance with the URL. Further, in such a case, it may also be possible to automatically perform control to determine an application on the UI screen of which a moving image is reproduced on the message creation/display application. Alternatively, it may also be possible to enable a user to select which of the message creation/display application and another application to use to reproduce a moving image by presenting alternatives on the UI screen of the message creation/display application.

In the case when it is determined that the message type is a text/Web message at step S503, a UI screen for a text/Web message is displayed at step S506. Then, on the UI screen for a text/Web message, a message, a date, and so on, are displayed based on the message data. At this time, in the case when parameters specifying the character color and the font are included in the message data, a message and a date are displayed by using the specified character color and font. Further, in the case of a text/Web message, there is a case when position information is included in the message data. In this case, it may also be possible to display a map on the UI screen of the message creation/display application and to set a pin at the coordinates indicated by the position information on the displayed map. Alternatively, it may also be possible to activate a map application separate from the message creation/display application, to display a map on the UI screen of the map application, and to set a pin on the displayed map. The activation method of a map application and the delivery method of position information are the same as the activation method of a Web browser and the delivery method of a URL, respectively, described above. Further, in the case of a text/Web message, there is a case when the URL of a Web page is included in the message data. In this case, as in the case of a moving image message described above, it may also be possible to display a Web page on the UI screen of the message creation/display application, or to display a Web page by an application other than the message creation/display application, for example, by a Web browser. In the case when it is possible to include a plurality of pieces of information in one piece of message data like a text/Web message, only the information extracted from the message data is displayed on the UI screen for a text/Web message. As an example, a case is explained where the contents of the message, the date information, and the URL of a Web page are included in the message data and position information is not included. In this case, on the UI screen for a text/Web message, the item relating to position information is not displayed and the message, the date, and the link to a Web page are displayed. Alternatively, in the case when a plurality of pieces of information is included, it may also be possible to display a button, a checkbox, and so on, corresponding to each piece of information first and then to display corresponding information in the case when the button or the checkbox is operated by a user.

<About Effect, Modification Example, and so on, of the Present Embodiment>

As described above, in the present embodiment, it is possible to include at least one of information, which is a message itself, and information for accessing the outside, such as a URL, in message data that is embedded in an image. Due to this, in the case when information, which is a message itself, is included in the message data, it is possible to display the message without network connection and without the need to access an external device. On the other hand, in the case when information for accessing an external device, that is, a URL is included in the message data, the message is displayed by accessing the external device. As described above, it is not necessarily required to connect to a network and to access an external device to display a message and it is only required to connect to a network only in the case when it is necessary in accordance with analysis results of the extracted message data.

Further, in the case when the results of analyzing the extracted message data make it clear that an application other than the message creation/display application needs to be used, it may also be possible to activate another application without an operation of a user. As an example, a case is considered where only one of the URL of a moving image, the URL of a Web page, and the position information is included in the message data, other than the identifier of the message type. In this case, by activating a moving image browser application, a Web browser, or a map application at the point in time of the analysis of the extracted message data, it is possible to reduce a user operation and operability improves.

Other Embodiments

Embodiment(s) of the present invention can also be realized by a computer of a system or an apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., an application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., a central processing unit (CPU), or a micro processing unit (MPU)) and may include a network of separate computers or separate processors to read out and to execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), a digital versatile disc (DVD), or a Blu-ray Disc (BD)™) a flash memory device, a memory card, and the like.

Due to the present invention, it is made possible to produce a display in accordance with the type of additional information extracted from captured image data.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

I claim:

1. An image processing method comprising:
   an acquisition step of acquiring image data by capturing printed matter, wherein first information and second information, indicating a type of the first information, are embedded in the printed matter as an electronic watermark;
   an extraction step of extracting the first information and the second information from the image data acquired at the acquisition step; and
   a processing step of processing the extracted first information by different processing methods in accordance with the extracted second information, wherein, based on that the type of the first information indicated by the second information is a predetermined type, the extracted first information is processed at the processing step, by a predetermined processing method for access to an external device using the extracted first information and display of a web page based on the access.

2. The image processing method according to claim 1, wherein the acquisition step, the extraction step, and the processing step are performed by a predetermined application.

3. The image processing method according to claim 2, wherein the extracted first information is processed by the predetermined processing method at the processing step, such that the access to the external device and the display of the web page are performed by a web browser different from the predetermined application.

4. The image processing method according to claim 3, wherein the extracted first information is processed by the predetermined processing method at the processing step, such that that the web browser is activated and the access to the external device and the display of the web page are performed by the activated web browser.

5. The image processing method according to claim 3, wherein, based on that the type of the first information indicated by the second information is a second type, different from the predetermined type, the extracted first information is processed at the processing step by the predetermined application without using the web browser.

6. The image processing method according to claim 3, wherein, based on that the type of the first information indicated by the second information is the predetermined type, the extracted first information is processed at the processing step as a uniform resource locator (URL).

7. The image processing method according to claim 2, wherein, at the processing step, a map application different from the predetermined application is caused to display a map on a display device by the predetermined processing, in accordance with position information as the first information.

8. The image processing method according to claim 1, wherein, at the processing step, display processing is performed based on the first information, by different display methods in accordance with the second information, and wherein the different display methods include a display method for the display of the web page.

9. The image processing method according to claim 8, wherein, based on that the type of the first information indicated by the second information is a second type, different from the predetermined type, the extracted first information is displayed on a display device by the display processing at the processing step.

10. The image processing method according to claim 9, wherein, at the processing step, the first information is displayed as text.

11. The image processing method according to claim 8, wherein, based on that the type of the first information indicated by the second information is a second type, different from the predetermined type, animation corresponding to the first information is reproduced in a display device by the display processing.

12. The image processing method according to claim 8, wherein, based on that the type of the first information indicated by the second information is a second type, different from the predetermined type, a predetermined button is displayed on a display device by the display processing, and a display is produced by the display processing, based on the first information, in accordance with an instruction of a user for the predetermined button.

13. An image processing apparatus comprising:
   an acquisition unit configured to acquire image data by capturing printed matter, wherein first information and second information, indicating a type of the first information, are embedded in the printed matter as an electronic watermark;
   an extraction unit configured to extract the first information and the second information from the image data acquired by the acquisition unit; and
   a processing unit configured to process the extracted first information by different processing methods in accordance with the extracted second information, wherein, based on that the type of the first information indicated by the second information is a predetermined type, the extracted first information is processed by the processing unit, by a predetermined processing method for access to an external devise using the extracted first information and display of a web page based on the access.

14. A non-transitory computer readable storage medium storing a program for causing a computer to perform an image processing method, the image processing method comprising:
   an acquisition step of acquiring image data by capturing printed matter, wherein first information and second information, indicating a type of the first information, are embedded in the printed matter as an electronic watermark;
   an extraction step of extracting the first information and the second information from the image data acquired at the acquisition step; and
   a processing step of processing the extracted first information by different processing methods in accordance with the extracted second information, wherein, based on that the type of the first information indicated by the second information is a predetermined type, the extracted first information is processed at the processing step, by a predetermined processing method for access to an external devise using the extracted first information and display of a web page based on the access.

* * * * *